(12) United States Patent
Heywood-Lonsdale et al.

(10) Patent No.: US 9,257,095 B2
(45) Date of Patent: Feb. 9, 2016

(54) DISPLAY DEVICE WITH A BACKLIGHT

(71) Applicant: Sharp Kabushiki Kaisha, Osaka (JP)

(72) Inventors: Edward David Heywood-Lonsdale, Oxford (GB); Benjamin John Broughton, Oxford (GB); Emma Jayne Walton, Oxford (GB); John Patrick Nonweiler, Oxford (GB); Fumitaka Seki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 33 days.

(21) Appl. No.: 14/319,277

(22) Filed: Jun. 30, 2014

(65) Prior Publication Data

US 2015/0379960 A1  Dec. 31, 2015

(51) Int. Cl.
*G09G 3/36* (2006.01)
*G09G 5/10* (2006.01)
*G02F 1/1335* (2006.01)
*G09G 5/02* (2006.01)
*G09G 5/18* (2006.01)

(52) U.S. Cl.
CPC ............ *G09G 5/10* (2013.01); *G02F 1/133514* (2013.01); *G02F 1/133603* (2013.01); *G09G 3/3696* (2013.01); *G09G 5/02* (2013.01); *G09G 5/18* (2013.01); *G09G 2330/021* (2013.01)

(58) Field of Classification Search
CPC ............. G09G 3/36; G09G 3/20; G09G 3/32; G09G 5/10; G09G 5/00
See application file for complete search history.

(56) References Cited

U.S. PATENT DOCUMENTS

| | | | |
|---|---|---|---|
| 7,106,276 B2 | 9/2006 | Akiyama | |
| 7,333,165 B2 | 2/2008 | Nakano et al. | |
| 8,300,069 B2 | 10/2012 | Langendijk et al. | |
| 2007/0103934 A1 | 5/2007 | Keh et al. | |
| 2008/0150864 A1 | 6/2008 | Bergquist | |
| 2009/0160756 A1 | 6/2009 | Van Beek et al. | |
| 2012/0242564 A1* | 9/2012 | Morishita | G09G 3/3413 345/102 |

OTHER PUBLICATIONS

Ilias Pappas, Stylianos Siskos and Charalambos A. Dimitriadis, "Active-Matrix Liquid Crystal Displays-Operation, Electronics and Analog Circuits Design", Nov. 2009.

* cited by examiner

*Primary Examiner* — Michael Faragalla
(74) *Attorney, Agent, or Firm* — Renner, Otto, Boisselle & Sklar, LLP

(57) ABSTRACT

A display includes a backlight portion having at least one broad spectrum emitter (such as white) and at least one narrow spectrum emitter (such as red, green, and blue), a liquid crystal panel for displaying an image by spatial light modulation, and control electronics configured to receive input image data and output control signals to both the backlight portion and liquid crystal panel. The control electronics is configured to use color rendering capabilities of the liquid crystal panel under illumination from each of the emitter types individually to calculate a minimum power combination of emission from each emitter type required to display the input image data. The control electronics is further configured to modify the input image data according to the calculated minimum power combination of emitter powers so a resulting display of colors in the image data remains despite changing illumination conditions.

17 Claims, 8 Drawing Sheets

# DISPLAY DEVICE WITH A BACKLIGHT

TECHNICAL FIELD

The invention relates to a display device and, more particularly, to a display device comprising a combination of backlight emitters, and a means of selectively powering each backlight at different levels, and a means of modifying the image data input to the display so as to maintain correct color appearance under the different possible backlight emitter levels.

BACKGROUND ART

In an active matrix liquid crystal display (LCD), an image is produced by controlling the light transmittance of a two-dimensional array of discrete image elements (subpixels). Control is performed by the conversion of digital image data, consisting of a data value for each subpixel of the image, into analogue voltages with values dependent on that data, and direction of those voltages to each pixel electrode in the array via an active matrix of source data lines, gate lines and thin film transistor (TFT) switching elements.

A block of three subpixels is termed a pixel. Each subpixel is associated with a color filter (typically Red, Green and Blue), and by controlling the amount of light being transmitted through these three color channels, any resultant linear combination of Red, Green and Blue light can be produced. In the case of one or more color channels being in the "off" state—that is, the liquid crystals are energized in such a way that no light is transmitted through them—the color is said to be "saturated" in that the color is as vivid as is possible with this display. Some LCDs are capable of producing very vivid saturated colors, while some are only able to produce pale colors, even with only one color channel in the on state. The vividness of the color is related to its light spectrum. A light with a very broad spectrum will appear pale, while a narrow spectral light will appear vivid. A monochromatic light (that is, light with only one wavelength, typically produced by a laser) is the most vivid light possible.

In conventional LCDs, a broad spectrum light is emitted by a backlight, and each color filter will only transmit a particular range of wavelengths. A narrow range will produce more vivid colors, but since more light is being absorbed by the filter, the brightness of the screen is reduced. In addition, LEDs with a broad spectral emission are in general more power-efficient than those with narrower emission windows.

There have been several methods tried to improve the power efficiency of high-color screens. In Akiyama, U.S. Pat. No. 7,106,276 (issued Sep. 12, 2006) the inventors supplement the white LED (W LED) with three separate LEDs each with a narrow spectral emission, in the three color primaries. However, the power requirement of this configuration is large, and outweighs the advantage of the high-color display. Bergquist, Publication US20080150864 (published Jun. 26, 2008) specifies using only Red Green and Blue LEDs (RGB LEDs), in such a way that for each color primary, if the image content allows it, the corresponding LED can be dimmed and the image data altered. In this way, the power requirement can be reduced while maintaining the color vividness. However, this still requires the RGB LEDs to be used even for pale colors, which is less efficient than using W LEDs.

Van Beek et al., US20090160756 (published Jun. 25, 2009) attempts to deal with this by combining RGB LEDs and W LEDs, and selectively choosing which LEDs to use at any one time. The inventors calculate the required drive current to each of the independently controllable R,G,B LEDs, and then make assumptions about the possibility of replacing R,G,B specific currents with a general W current. In this way they reduce the power consumption of the backlight device, but they also restrict the vividness of the image data to be displayed. Specifically, if their algorithm concludes that the Red, Green and Blue LEDs should all be driven at maximum current, then they will replace this with a White LED being driven at full current and the RGB LED not driven at all. This clearly reduces the vividness of the color that the panel can produce, even though the image content might require high saturation levels. More generally, for any color which fits inside the gamut of the White LED, this approach will dim the W LED to the smallest of the three colors, and supplement it with RGB LEDs, instead of the more efficient approach of using the W LED to supply all the required light, and not using the RGB LEDs.

Langendijk et al., U.S. Pat. No. 8,300,069 (issued on Oct. 30, 2012) discloses another means of balancing different backlights. The inventors do not use a W LED, but use a fourth (White) subpixel. They control the current going to the Red LED, and to the Green and Blue LED. To avoid "chromaticity dependence"—that is, Green light being transmitted through the Blue color filter and vice versa—the ratio of G:B current is held constant. For pale pixels, the White subpixel can be opened in such a way that the pixel will appear very bright; for vivid pixels, the White will be closed and only the desired primaries will be transmissive. In this way, the apparent brightness of the panel can be increased in pale areas so that the overall brightness appears greater; or the backlight powers can be scaled down to reduce the power increase necessitated by having the RGB LEDs. However, this gives a non-uniform distribution of brightnesses, contrary to standardized color spaces.

Many conventional devices (e.g., Nakano et al., U.S. Pat. No. 7,333,165 (issued Feb. 19, 2008), Keh et al., US20070103934 (published May 10, 2007), and Morishita, US20120242564 (published Sep. 27, 2012)) use a combination of different backlights, but the proportion of each backlight being used depends on a variety of different system conditions. For example, the ambient lighting, the desired brightness, or the display mode being used (e.g., Vivid, Low power), can all affect the balance.

SUMMARY OF INVENTION

In conventional display devices there does not exist any display comprising independently controllable R, G, B and W light emitting devices, and also having a method for selecting the optimum drive currents for each emitter in the backlight such that image content can be faithfully displayed, either to an intended standard color space, or to the maximum achievable gamut of the display, with a minimal power requirement. The present invention provides a complete system in which, for every image to be displayed on the display, the image data is analyzed, the optimal backlighting conditions are calculated and applied, and the image data is converted to be displayed accurately given the new light spectrum emitted from the backlight.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

In the annexed drawings, like references indicate like parts or features.

DESCRIPTION OF REFERENCE NUMERALS

Figure 1:
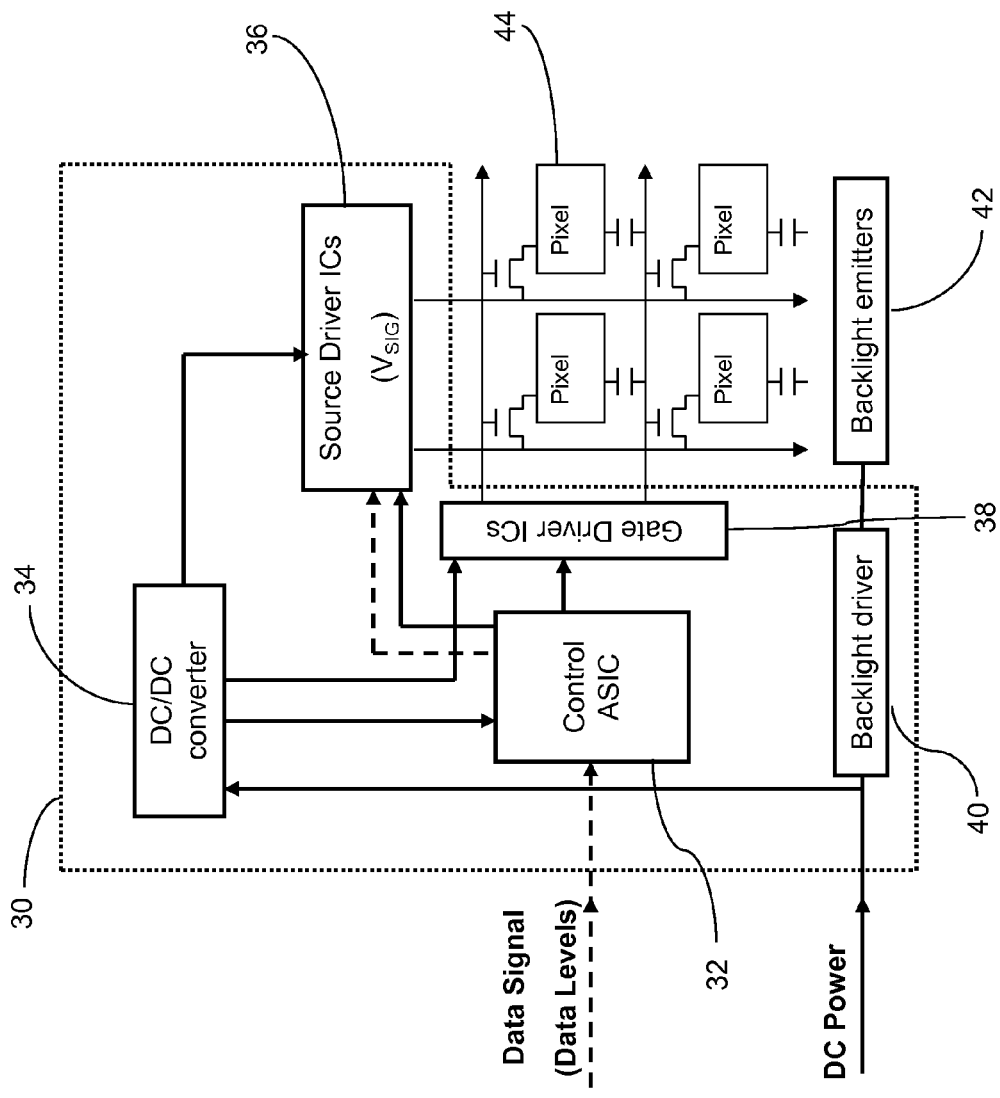
FIG. 1 is a schematic diagram depicting a conventional display device.

1. W LED transmission through blue color filter
2. W LED transmission through green color filter
3. W LED transmission through red color filter
4. B LED transmission through blue color filter
5. B LED transmission through green color filter
6. B LED transmission through red color filter
7. RGB LEDs transmission through blue color filter
8. RGB LEDs transmission through green color filter
9. RGB LEDs transmission through red color filter
10. RGB LEDs transmission through green color filter
11. G LEDs transmission through green color filter
12. Gamut enclosing all visible colors
13. Gamut achievable by W LED
14. Gamut achievable by RGB LEDs
15. Gamut achievable by RGB LEDs one at a time
16. Gamut achievable by RGB LEDs on together
30. Control electronics
32. Control ASIC
34. DC/DC converter
36. Source Driver ICs
38. Gate Driver ICs
40. Inverter
42. Backlight lamp
44. LCD display pixels
50. LCD device
52. Image analysis component
54. Image conversion component
56. Control ASIC
58. Gate Driver ICs
60. Source Driver ICs
62. Backlight
64. W LED
66. Red LED
68. Green LED
70. Blue LED
72. Backlight controller
74. LCD display pixels

DETAILED DESCRIPTION OF INVENTION

In a first embodiment, a display device includes an LC display, with modified control electronics and backlight emitters. An LCD display generally has several component parts including:

1. A backlighting unit to supply even, wide angle illumination to the panel.

2. Control electronics to receive digital image data and output analogue signal voltages for each pixel, as well as timing pulses and a common voltage for the counter electrode of all pixels. A schematic of the standard layout of LCD control electronics is shown in FIG. 1 (adapted from Ilias Pappas, Stylianos Siskos and Charalambos A. Dimitriadis (2009). Active-Matrix Liquid Crystal Displays—Operation, Electronics and Analog Circuits Design, New Developments in Liquid Crystals, Georgiy V Tkachenko (Ed.), ISBN: 978-953-307-015-5, InTech, DOI: 10.5772/9686).

As seen in FIG. 1, control electronics 30 include a control ASIC 32 that receives data signals from a data line. The control ASIC 32 is configured with a DC/DC converter 34 to provide input signals to source driver ICs 36 and gate driver ICs 38. Power is provided via an inverter 40 that also powers the backlight lamp 42. The source and gate driver ICs provide the drive signals to the pixels 44 that form the LCD display.

3. A liquid crystal (LC) panel, for displaying an image by spatial light modulation, including two opposing glass substrates, onto one of which is disposed an array of pixel electrodes and active matrix array to direct the electronic signals, received from the control electronics, to the pixel electrodes. Onto the other substrate is usually disposed a uniform common electrode and color filter array film. Between the glass substrates is contained a liquid crystal layer of given thickness, usually 2-6 µm, which may be aligned by the presence of an alignment layer on the inner surfaces of the glass substrates. The glass substrates will generally be placed between crossed polarizing films and other optical compensation films to cause the electrically induced alignment changes within each pixel region of the LC layer to produce the desired optical modulation of light from the backlight unit and ambient surroundings, and thereby generate the image.

Figure 2:
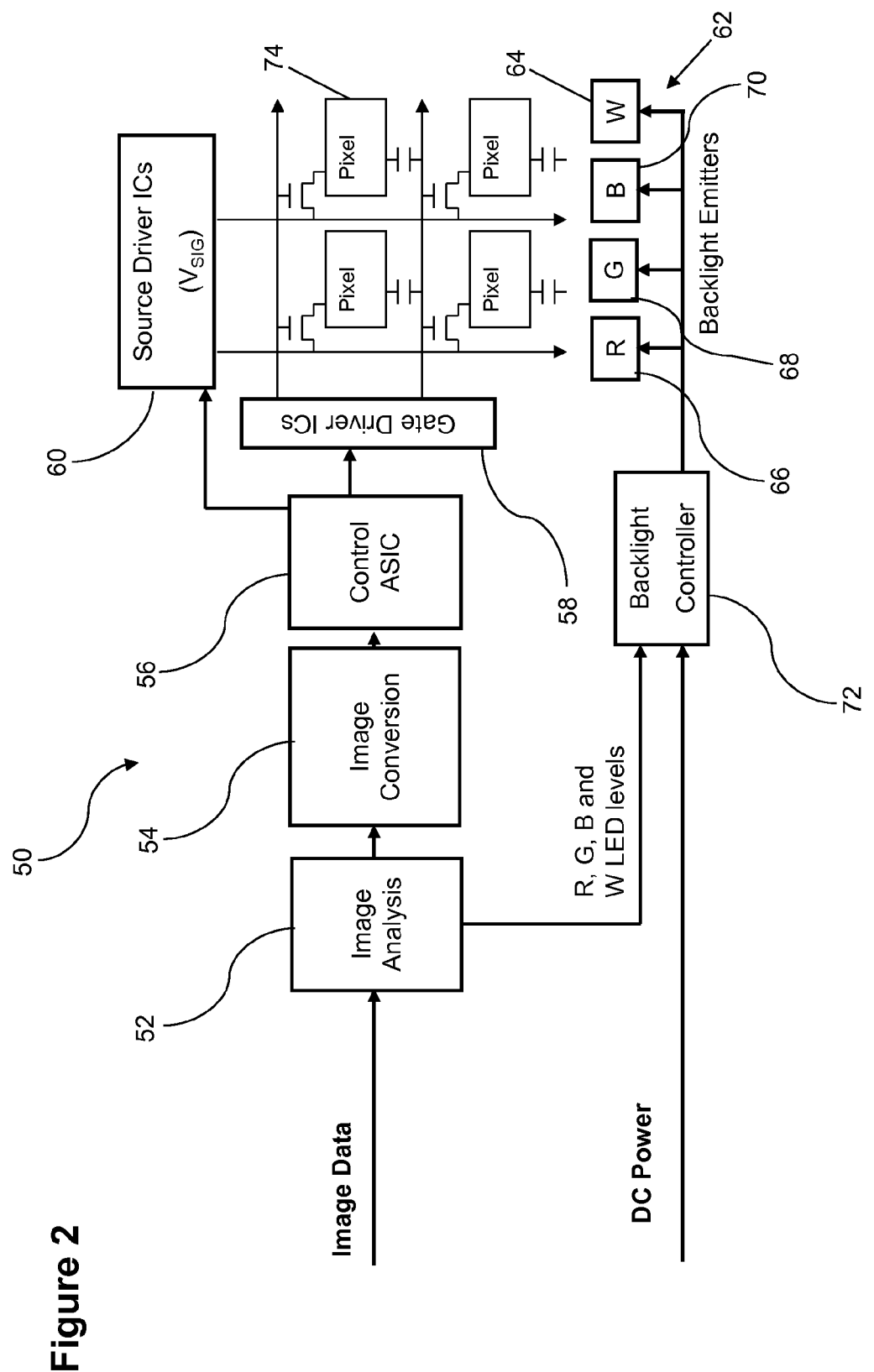
FIG. 2 is a schematic diagram depicting control electronics in accordance with embodiments of the present invention.

Referring to FIG. 2, embodiments of the present invention differ from a standard LCD in the backlight structure, and in the control electronics. In an exemplary embodiment of an LCD device 50 as depicted in FIG. 2, image data is transferred from a processor elsewhere on the device to the control ASIC electronics 56, and the data is analyzed by an image analysis component 52 and if necessary altered by an image conversion component 54. The data is then sent to the gate 58 and source 60 driver ICs to be displayed on the panel by the pixels 74. In addition, the backlight state is altered based on the image analysis. The backlight 62 includes different types of light sources with different spectral emissions, such that, in one embodiment, one type of light source being exclusively on will result in a different display image than the case of a different type of light source being exclusively on. Specifically, a preferred case involves one broad spectrum LED 64 type with a white appearance, and three narrow spectrum LED types with emissions at red 66, green 68 and blue 70 wavelengths respectively, which when combined give a white appearance. These three LED types (RGB LEDs) are independently controllable by a backlight controller 72.

This embodiment is configured such that the W LED in combination with the color filter transmission windows makes the display capable of reproducing a given color gamut. The RGB LEDs have narrower emission spectra than the W LEDs, such that when used in combination with the same color filter they produce a larger gamut. However, typically the lowest power means of displaying images comprising colors within that achievable by the W LEDs only will be by using the W LEDs only, due to their higher efficiency, so the control electronics will aim to use the W LEDS where possible, and only exchange emission from the W LEDS for emission from the RGB LEDs when the input image data specifies resultant colors outside the gamut achievable by the W LEDs only. Thereby, the system of this embodiment selects the optimum drive currents for each LED in the backlight such that image content can be faithfully displayed, according to an image standard or display specification, with color gamut that may exceed that achievable by the broadband emitter only, with a minimal power requirement.

After the image data has reached the control electronics, it is analyzed such that the optimal current or duty ratio for each LED type is calculated for each pixel. To give a few examples: In the case of a pixel with image data (Red=255, Green=0, Blue=0), the LED duty ratio might be calculated as (Red=100%, Green=3%, Blue=2%, White=0%). The extra colors present might be necessary to account for light from the green and blue LEDs leaking through the red color filter, for example. In another example, content of (Red=120, Green=150, Blue=70) might lead to an LED duty ratio of (Red=0%, Green=0%, Blue=0%, White=32%) because the target point is within the color space reproducible by the white LED, and it does not need to be maximally bright to display this color point. If the duty ratio of the white LED is too high relative to the other LEDs' duty ratios, then it will not be possible to display saturated colors since the combination of emissions from the different LED types will produce a spectrum too broad for vivid colors to be produced.

Figure 3:
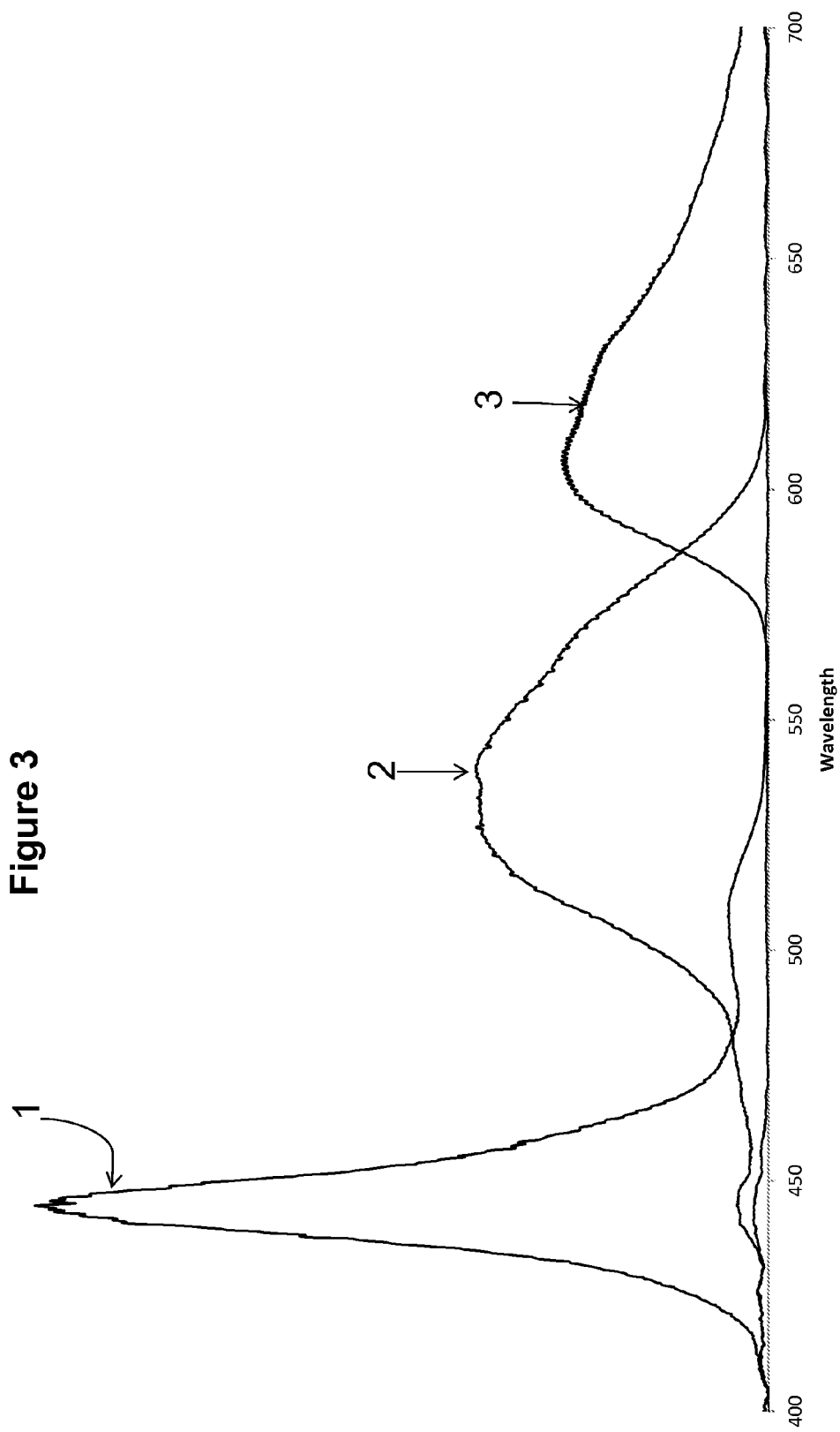
FIG. 3 is a graphical depiction of spectral transmission through color filters of a W LED wherein curve 1 is the transmission of the W LED through the Blue color filter, curve 2 is the transmission of the W LED through the Green color filter, and curve 3 is the transmission of the W LED through the Red color filter.
Figure 4:
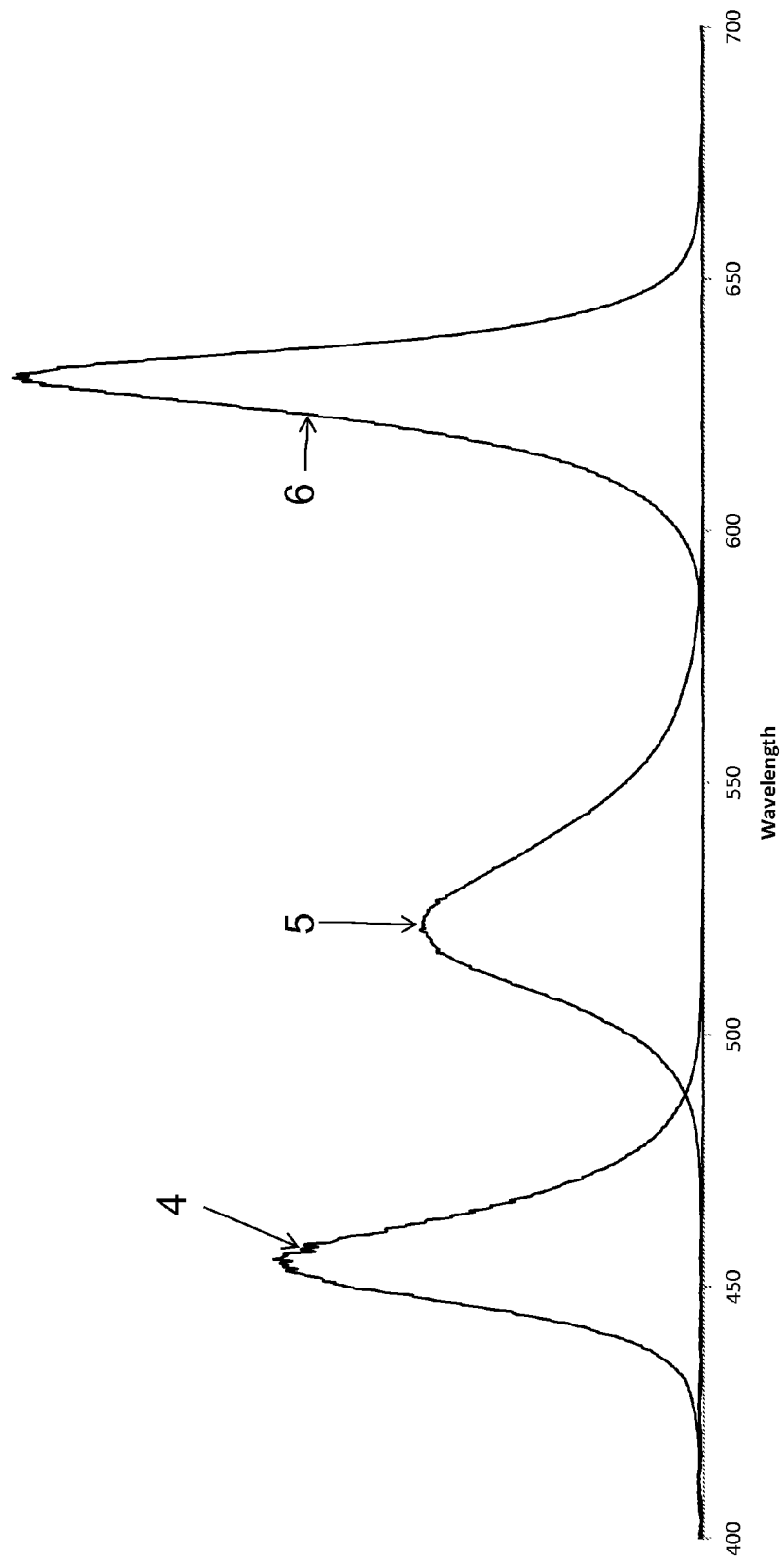
FIG. 4 is a graphical depiction of spectral transmission through color filters for the case of RGB LEDs being on one at a time wherein curve 4 is the transmission of the B LED through the Blue color filter, curve 5 is the transmission of the G LED through the Green color filter, and curve 6 is the transmission of the B LED through the Red color filter.
Figure 5:
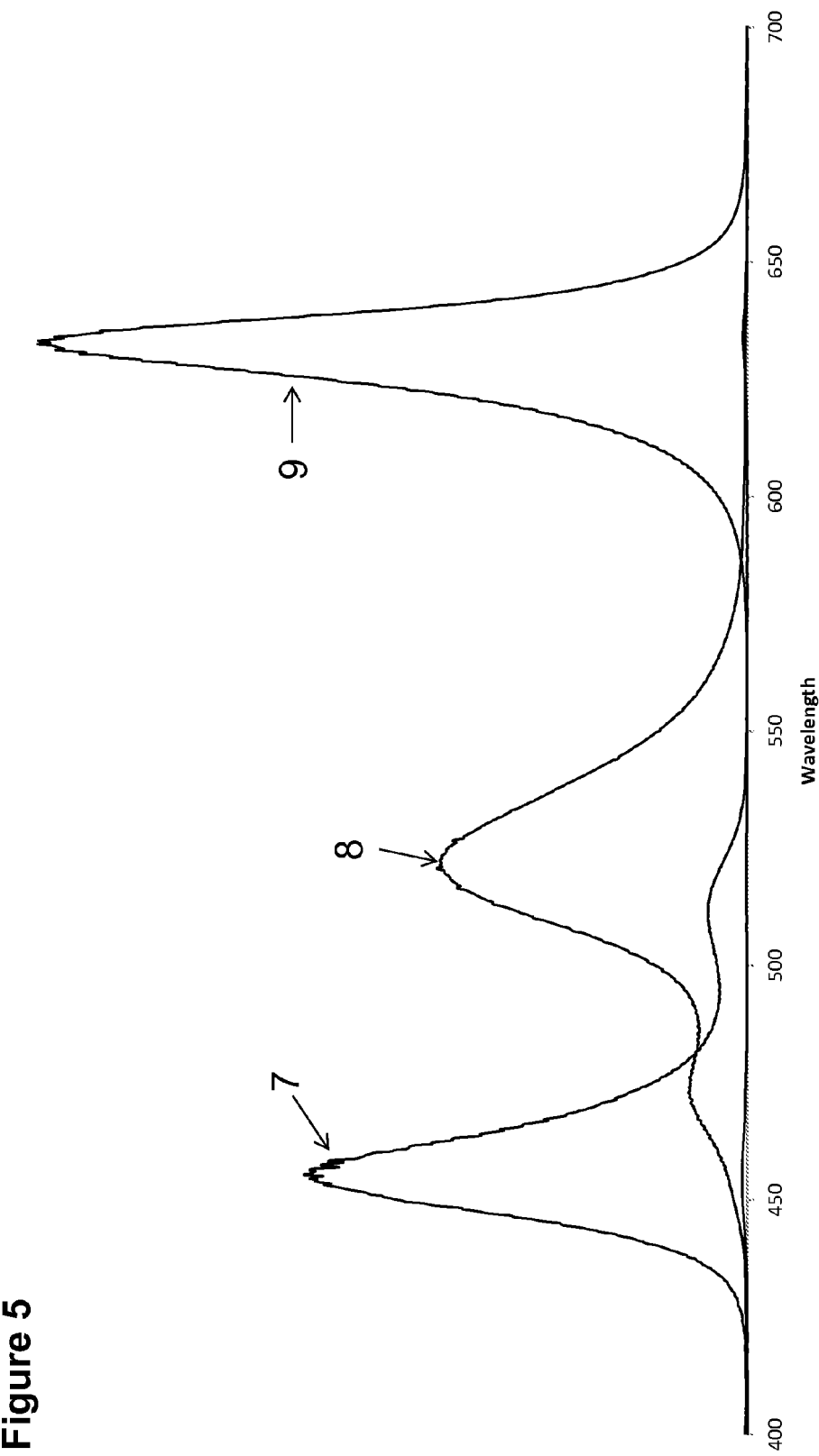
FIG. 5 is a graphical depiction of spectral transmission through color filters for the case of all RGB LEDs being on together wherein curve 7 is the transmission of the RGB LEDs through the Blue color filter, curve 8 is the transmission of the RGB LEDs through the Green color filter, and curve 9 is the transmission of the RGB LEDs through the Red color filter.
Figure 6:
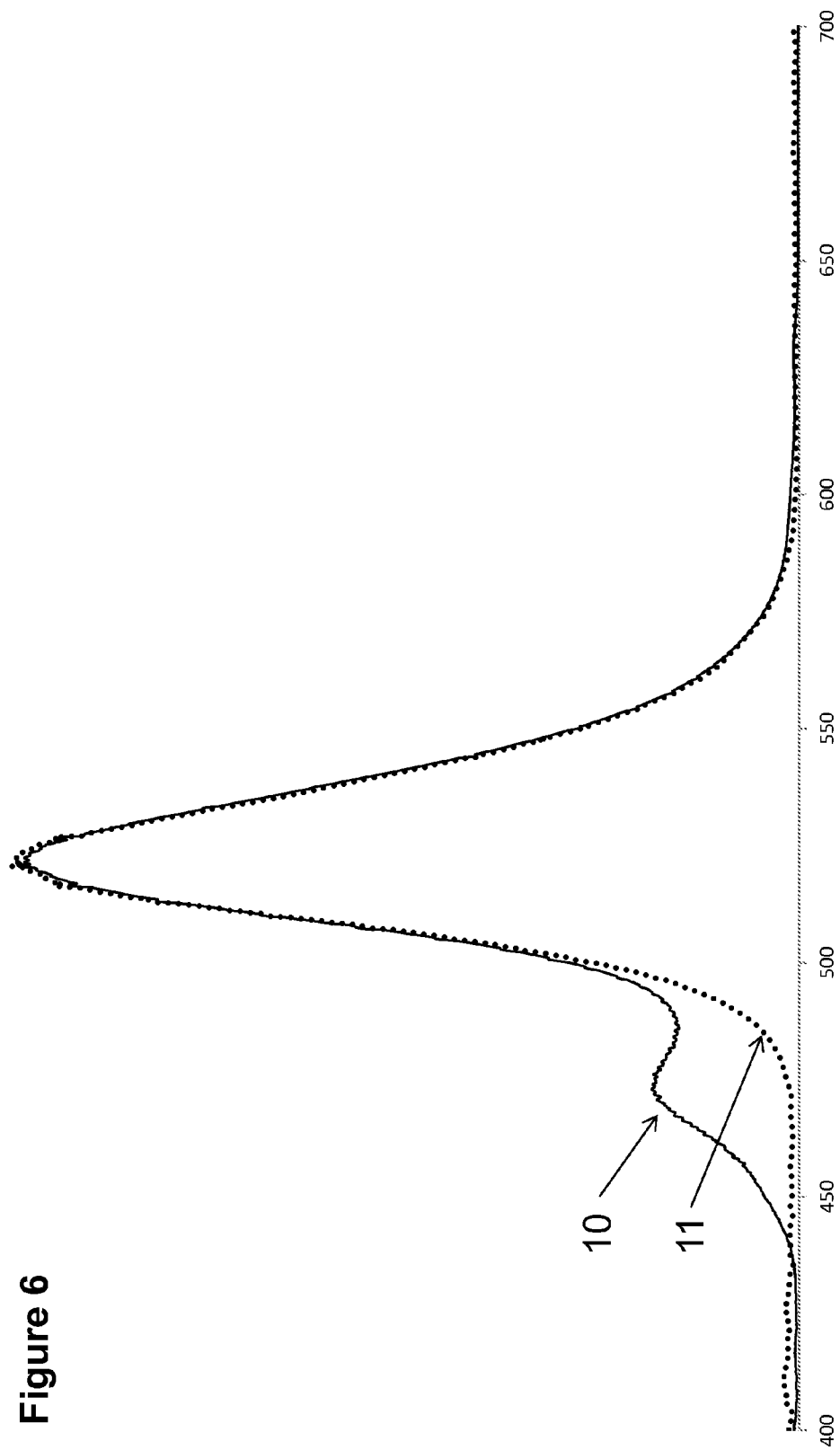
FIG. 6 is a graphical depiction of spectral transmission through the green color filter for the two cases of RGB LEDs all being on, and of just G LED being on wherein curve 10 is the transmission of the RGB LEDs through the green color filter, and curve 11 is the transmission of the G LEDs through the green color filter.

The spectrum of light being transmitted through the color filters is shown in FIGS. 3, 4, 5, and 6. FIG. 3 is a graphical depiction of spectral transmission through color filters of a W LED wherein curve 1 is the transmission of the W LED through the Blue color filter, curve 2 is the transmission of the W LED through the Green color filter, and curve 3 is the transmission of the W LED through the Red color filter. FIG. 4 is a graphical depiction of spectral transmission through color filters for the case of RGB LEDs being on one at a time wherein curve 4 is the transmission of the B LED through the Blue color filter, curve 5 is the transmission of the G LED through the Green color filter, and curve 6 is the transmission of the R LED through the Red color filter. FIG. 5 is a graphical depiction of spectral transmission through color filters for the case of all RGB LEDs being on together wherein curve 7 is the transmission of the RGB LEDs through the Blue color filter, curve 8 is the transmission of the RGB LEDs through the Green color filter, and curve 9 is the transmission of the RGB LEDs through the Red color filter. FIG. 6 is a graphical depiction of spectral transmission through the green color filter for the two cases of RGB LEDs all being on, and of just G LED being on wherein curve 10 is the transmission of the RGB LEDs through the green color filter, and curve 11 is the transmission of the G LED through the green color filter.

Figure 7:
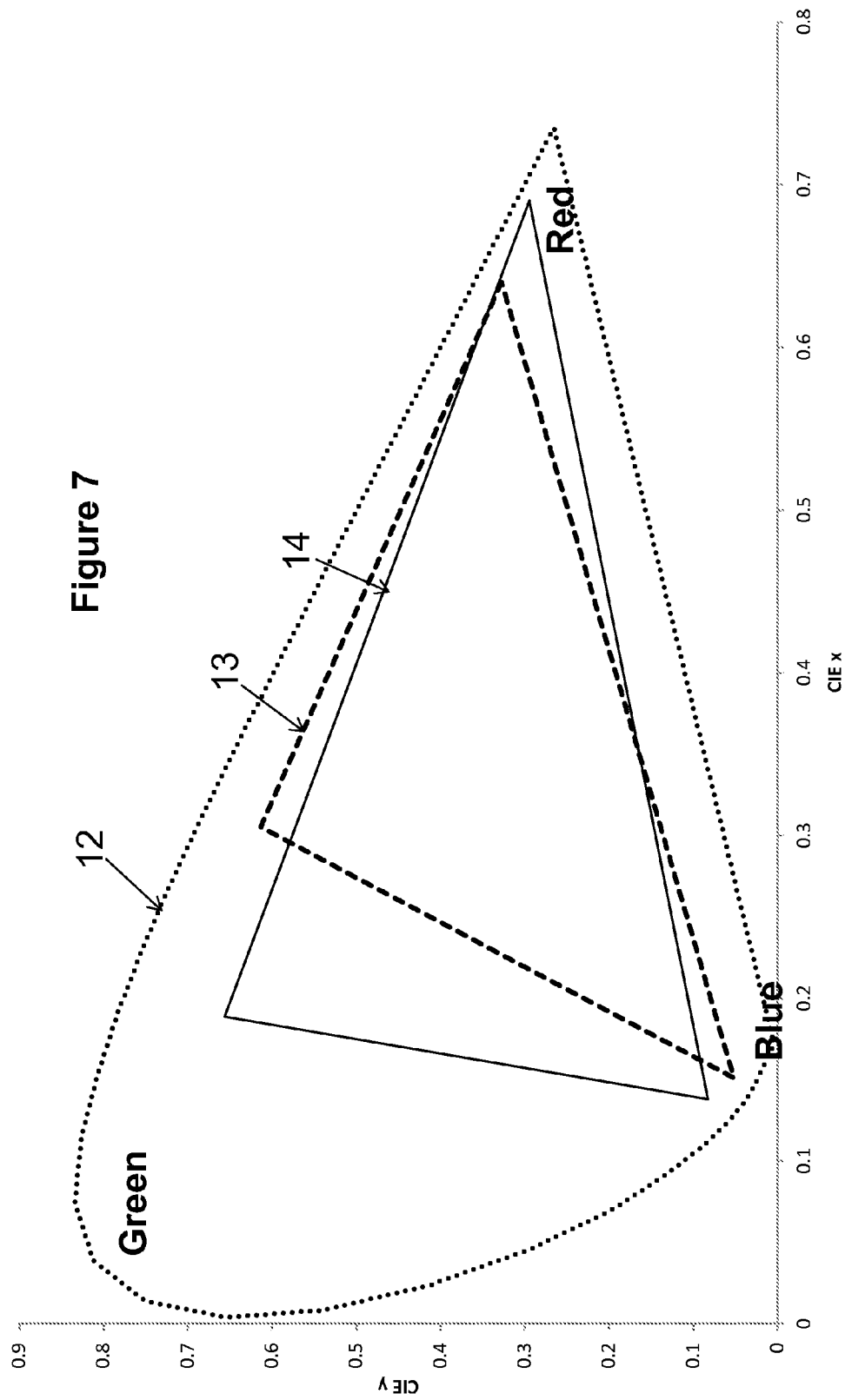
FIG. 7 is a graphical depiction of chromaticity of R,G,B subpixels for different LED types in the CIE 1931 xy chromaticity diagram, wherein shape 12 is the gamut enclosing all visible colors, shape 13 is the gamut achievable by the W LED, and shape 14 is the gamut achievable by the RGB LEDs.
Figure 8:
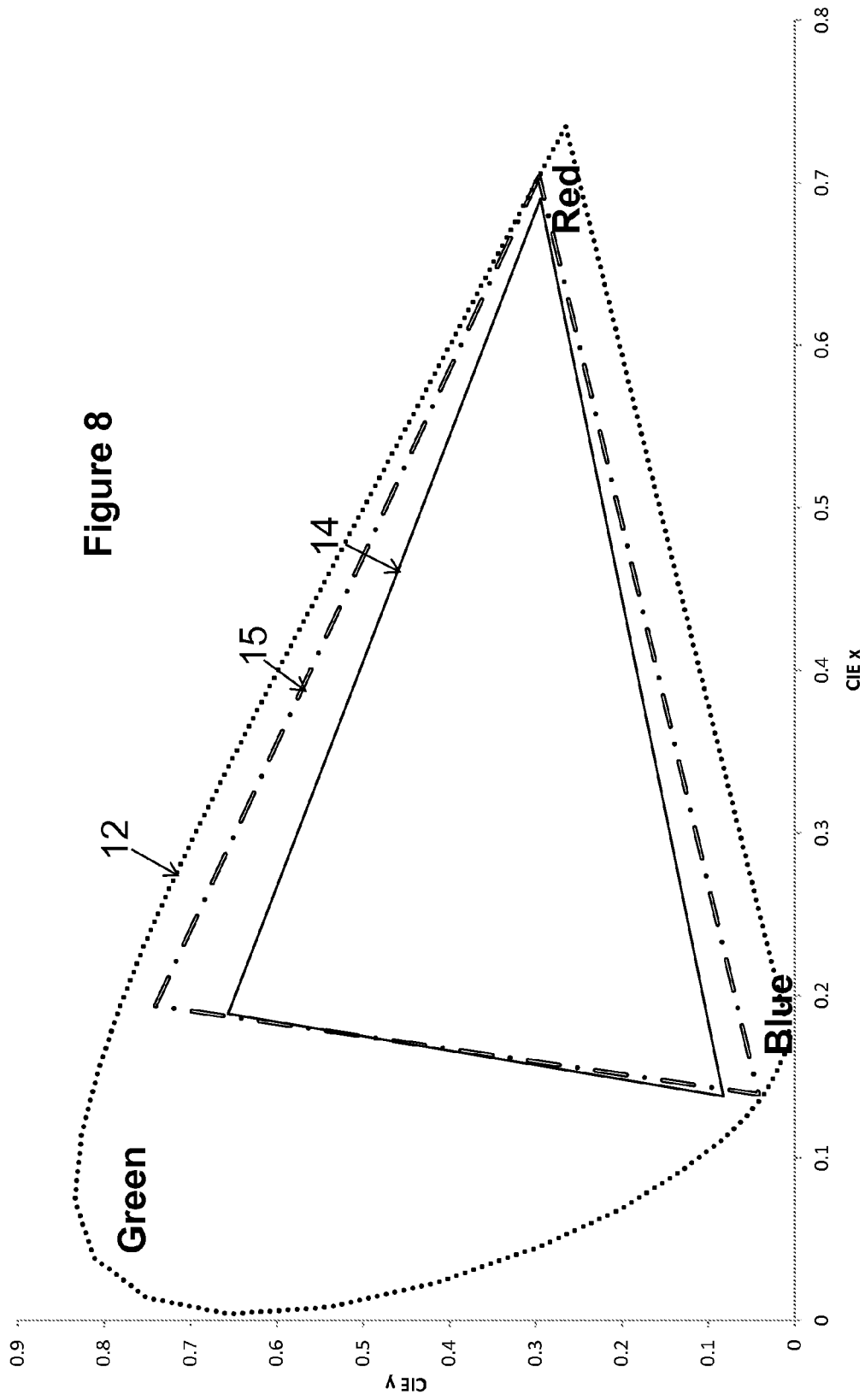
FIG. 8 is a graphical depiction of chromaticity of R,G,B subpixels for RGB LEDs in the CIE 1931 xy chromaticity diagram, wherein shape 12 is the gamut enclosing all visible colors, shape 15 is the gamut achievable by the RGB LEDs being on one at a time, and shape 16 is the gamut achievable by the RGB LEDs being on together.

The corresponding color gamuts are shown in FIGS. 7 and 8. FIG. 7 is a graphical depiction of chromaticity of R,G,B subpixels for different LED types in the CIE 1931 xy chromaticity diagram, wherein shape 12 is the gamut enclosing all visible colors, shape 13 is the gamut achievable by the W LED, and shape 14 is the gamut achievable by the RGB LEDs. FIG. 8 is a graphical depiction of chromaticity of R,G,B subpixels for RGB LEDs in the CIE 1931 xy chromaticity diagram, wherein shape 12 is the gamut enclosing all visible colors, shape 15 is the gamut achievable by the RGB LEDs being on one at a time, and shape 14 is as before the gamut achievable by the RGB LEDs being on together.

In an exemplary embodiment, these LED duty ratios are calculated for each pixel as follows:
  Calculate the required LC transmission for each color filter, with the W LED on only.
  If any transmissions are negative, then the color is outside the W gamut:
    Calculate how far outside of the gamut this color is, by determining the most negative this transmission could have been.
    As an example, if the pixel has (R,G,B) data (255,40,30), this might lead to a transmission of (100%, 3%, −4%). Now calculate the transmission levels for the point (255,40,0), which might be (100%,2.5%, −16%). This implies that the color is −4/−16=25% out of gamut.
    Therefore, the W LED must contribute no more than 75% of the light required.
  Calculate the W LED duty ratio, by assuming all LCs are fully transmissive, and calculating the required XYZ color. This is done by multiplying the RGB pixel data by the target XYZ matrix as shown in equation 8.
  Then, using the stored data for XYZ color from a fully white state, determine with a simple division how far the W LED can be dimmed.
  As a final step, if any of the transmission levels were negative, the final W LED duty ratio will be a given a proportion of this dimming level.
  It will be seen that we have now calculated the optimal W LED duty ratio, such that the image point can be fully shown, and such that the RGB LEDs will not be used any more than necessary; in this way, the power requirement is minimized.
  If the pixel data is inside the W LED gamut, then the process can proceed to the next pixel. If it is not however, then it is necessary to calculate how much supplementary light is needed from the RGB LEDs. To this end the system operates as follows:
    Determine as before the required XYZ color, determine the XYZ color provided by the (dimmed) W LED, and therefore calculate how much is still required by the RGB LEDs.

In general, the electronics will have stored in its memory, the XYZ color produced by different LED states with all LCs transmissive, as follows:

$$\begin{pmatrix} X \\ Y \\ Z \end{pmatrix} = \begin{pmatrix} X_r & X_g & X_b \\ Y_r & Y_g & Y_b \\ Z_r & Z_g & Z_b \end{pmatrix} \begin{pmatrix} R\ LED \\ G\ LED \\ B\ LED \end{pmatrix}$$

Therefore, by inverting this matrix, the RGB duty ratios can be easily calculated.

Finally, the ratio of RGB:W LED duty ratios is stored, as a constraint, since if the determined W LED duty ratio is too high relative to any of RGB, then some pixels in the image will be displayed as too pale.

Therefore, for each pixel the control electronics stores the minimum required ratios of RGB LED duty ratios to W LED duty ratios. Also stored is the brightness of each color primary.

In the next step, after every pixel has been analyzed (or in another embodiment, after a certain subset of pixels has been analyzed), six variables have been calculated:
$Y_c$ represents the required luminance of the color channel c,
$S_c$ represents the required ratio of the color channel c LED duty ratio to the white LED duty ratio.

These are related through the following six equations:

$$D_r \geq S_r D_w \quad (1)$$

$$D_g \geq S_g D_w \quad (2)$$

$$D_b \geq S_b D_w \quad (3)$$

That is, the duty ratio D of each color must be greater than, or equal to, the duty ratio of white multiplied by the previously calculated minimum ratio S for the color.

$$L_r D_r + L_{rw} D_w \geq Y_r \quad (4)$$

$$L_g D_g + L_{gw} D_w \geq Y_g \quad (5)$$

$$L_b D_b + L_{bw} D_w \geq Y_b \quad (6)$$

That is, the duty ratio D of each color, multiplied by the brightness L of that LED at full duty ratio, plus the contribution from the White LED through that color's color filter, must be greater than, or equal to, the required brightness Y of this color.

Finally, the algorithm operates to minimize the total power requirement $P_t$ of the backlight, so a final equation is constructed:

$$P_t = D_r P_r + D_g P_g + D_b P_b + D_w P_w \quad (7)$$

That is, the total power $P_t$ is equal to the sum of all the individual LED powers for each LED type, which are each equivalent to its power requirement at full duty ratio P, multiplied by its duty ratio D.

The duty ratio of each color must be greater than or equal to zero, and less than or equal to one. The next step is to minimize $P_t$ subject to these constraints and the constraints 1 to 6 above. This is a linear programming problem, which can be solved using standard methods, such as the simplex algorithm.

The result of this minimization is the optimal duty ratios for each LED in the backlight. This information will be sent to the backlight control ICs, which will accordingly dim the required LEDs. In an exemplary embodiment, this will be done through Pulse Width Modulation at a high frequency, although it will be clear that this is not the exclusive method for dimming LEDs.

It will be seen that at this point, the optimal duty ratios for all four LED types have been calculated. Therefore, the next stage of the algorithm can begin.

The device of this embodiment will also have stored in its memory the color produced by different LED and color filter conditions. Specifically, the color produced by the LCD when one LED type is exclusively on at full duty ratio, and one color filter is fully transmissive. This color will possibly be represented in a device-independent color space, such as CIE XYZ. Since dimming LEDs with a duty ratio-based approach is a linear operation, as opposed to for example reducing the current which has a non-linear effect on the LED luminance, it is possible to accurately determine the color that will be produced through each color filter, for any state of LEDs, through simple addition. In this way, a matrix transformation can be constructed, as follows:

$$\begin{pmatrix} X \\ Y \\ Z \end{pmatrix} = \begin{pmatrix} X_r & X_g & X_b \\ Y_r & Y_g & Y_b \\ Z_r & Z_g & Z_b \end{pmatrix} \begin{pmatrix} R \\ G \\ B \end{pmatrix} \quad (8)$$

In this case, R,G,B represents the transmission of the R,G,B color filters. This can be expressed in writing as, the total X component is equal to the X component produced by a fully transmissive red color filter, multiplied by its transmission, and so on for green and blue.

In the next step, the control electronics alters each pixel so that it will be displayed correctly with the new backlight state. To this end, the input image data in RGB format is converted into the device-independent color space, such as CIE XYZ as shown by equation 8.

The coefficients of this matrix transformation can be chosen in a number of ways. For example, they could be from a defined color space such as sRGB, or Adobe RGB, or other color spaces. They could also be defined as the largest gamut available with the LEDs, or somewhere in between such that a color improvement is realized but the increase in power requirement is reduced. This 3×3 matrix is fixed for each LED type, and is usually referred to by $M_r, M_g, M_b, M_w$. Therefore, after the duty ratios have been determined, it is possible to calculate the XYZ color that will be produced by a given transmission of each LC color type:

$$\begin{pmatrix} X \\ Y \\ Z \end{pmatrix} = (M_r D_r + M_g D_g + M_b D_b + M_w D_w) \begin{pmatrix} R \\ G \\ B \end{pmatrix} \quad (9)$$

By combining the two matrices from equations 8 and 9, it is possible to create a 3×3 transformation matrix to convert from the input image data, to the output image data, both in RGB space. This is achieved by combining them both and inverting the matrix in equation 9:

$$\begin{pmatrix} X_r & X_g & X_b \\ Y_r & Y_g & Y_b \\ Z_r & Z_g & Z_b \end{pmatrix} \begin{pmatrix} R \\ G \\ B \end{pmatrix}_{input} = \quad (10)$$

$$(M_r D_r + M_g D_g + M_b D_b + M_w D_w) \begin{pmatrix} R \\ G \\ B \end{pmatrix}_{output}$$

$$\begin{pmatrix} R \\ G \\ B \end{pmatrix}_{output} = \left[ (M_r D_r + M_g D_g + M_b D_b + M_w D_w)^{-1} \begin{pmatrix} X_r & X_g & X_b \\ Y_r & Y_g & Y_b \\ Z_r & Z_g & Z_b \end{pmatrix} \right] \begin{pmatrix} R \\ G \\ B \end{pmatrix}_{input} \quad (11)$$

$$\begin{pmatrix} R \\ G \\ B \end{pmatrix}_{output} = [M] \begin{pmatrix} R \\ G \\ B \end{pmatrix}_{input} \quad (12)$$

This matrix can be calculated just once per frame, and the resultant matrix is applied to each pixel to give new R,G,B values which are sent to the source and gate ICs to be shown on the panel. In some cases, the R,G,B values produced will be outside the allowable range (e.g., less than 0% transmission or greater than 100% transmission, through that color filter.) This will particularly happen, but not exclusively, when the six principal coefficients calculated previously are calculated in such a way that there is some allowable loss of quality. For example, if there was some allowable loss of peak brightness, such that some pixels will not be shown as brightly as they are specified, then the RGB data produced by equation 12 will show an LC transmission greater than 100%. In another example, if there was some allowable loss of vividness, an LC transmission of less than 0% will be specified. In the case of unallowable transmission levels, the data might simply be clipped until it is achievable, or the other colors might be changed to maintain the hue of the pixel, or other methods might be used.

In this exemplary embodiment therefore, the image data is scanned and for each pixel, six key variables are calculated (three absolute brightnesses, three ratios). Then the minimum allowable value for each six is determined by looking at the values of all the pixels being scanned, and from this the optimal (with regard to power consumption) duty ratios for each LED is calculated. Finally, the image data is processed to return optimal RGB data for the new backlight condition. It can be seen, therefore, that this embodiment uses the known color rendering capabilities of the display using the different backlight emitters to accurately and efficiently calculate the minimum power backlighting conditions required to enable the display to produce the colors intended by the input image data, and then modifies the input image data according to the calculated backlighting conditions to ensure those intended colors are indeed produced and kept constant in appearance even as the input image data and backlighting conditions are changed in subsequent frames. This is a significant advantage of the invention over conventional configurations.

A further significant advantage of this invention is that the use of the known color rendering capabilities of the display using the different backlight emitters in a device independent color space, allows cross-leakage of the different types of emitter through the different color filter windows to be accounted for. For example, increasing the duty ratio of the B LED will increase the transmission of light through the blue sub-pixels of the display, but also may increase the transmission of low wavelength bluish light through the green sub-pixels. Equations 9-12 allow this leakage to be accounted for, so that a display showing green image content having predominantly green LED illumination which changes in subsequent frames also includes some blue areas in the image, and therefore requires some emission from the blue LED, will not result in the color of the green regions changing, even though the chromaticity of light transmitted through the green sub-pixels will be altered. FIG. 6 shows the spectral transmission through the green color filter for the two cases of the G LED being fully on, and the G and B LEDs being fully on together.

One consequence of such cross-leakage is that the display may be capable of a more saturated green color (or any other color) when only green image content is input and therefore only emission from the green LED is required, than when (for example) both fully saturated green and blue portions are present in the input image and therefore both blue and green LEDs are required to be emitting, reducing the effective saturation of the green and/or blue sub-pixels. This is shown in FIG. 8, for a particular device with high Blue-Green leakage. The method of this embodiment allows the chromaticity of colours, such as pure green, to be kept constant, using the process of equations 9-12, despite these changing illumination conditions and therefore display primary color chromaticities, if the target color position associated with fully saturated input data is within the gamut achievable by the display when all of the red, green and blue emitters are on. However, it can be seen that this may limit the maximum saturation which may be displayed for image content including only or two primary colours. In a further embodiment then, the target colour in device independent space for fully and highly saturated input data is varied according to which other highly saturated colours are present in the input image data. Thereby image data which is wholly green for example, may be displayed with the maximum vividness of which the display is capable, and when the input image data contains both for example green and other colours, the chromaticity of the green regions is reduced. The display may allow this to be achieved in a gradual fashion so that sudden obtrusive changes to the color of image regions which are intended to remain constant do not occur.

In additional embodiments, it may be preferable to scan the image independently of the image data processing. For example, the image might only be analyzed every (for example) five frames, and the most recent duty ratios are used for each image processing operation. Alternatively, in the case that the image analysis takes more time than the image processing step, or is a power-consuming step which does not need to always run, the image processing might selectively pause after completion of an image for a period of time.

In another embodiment, it may be preferable to consume less processing power in the calculation of the ideal R,G,B duty ratios. To this end, a number of more simple algorithms exist. A particular approach which may be suitable involves calculating the White level for each pixel as before, such that the required saturation and brightness can be realised in a power-efficient manner. Instead of working in XYZ space (or any other device independent color space) to calculate the required RGB duty ratios, the algorithm simply calculates R,G,B levels by subtracting the scaled contribution to each color channel from the W LED. In this approach, it is seen that it is still possible to have the optimal saturation for each of the three color primaries.

In a further embodiment, it may be preferable to use a look up table approach to calculating the optimal LED duty ratios for each pixel. To reduce the mathematical complexity of the operation, there may be stored in the device's memory the optimal duty ratios for every pixel combination, or a given subset of every pixel combination, which can then, if desired, be interpolated. Furthermore, the look up table might be based on transforms of the image data, such as using HSV space instead of RGB, or any others.

In a further embodiment, the control electronics may consider the duty ratios calculated in the previous frame, and may restrict the change in LED duty ratios between frames, in certain circumstances. One benefit of this approach is to compensate for any timing problems between updating the LC layer and updating the backlight.

In another embodiment, the first half of the algorithm, which calculates the optimal duty ratios, is not used. Instead, when the control electronics is converting the image data to be displayed with the lighting conditions from the previous frame, the electronics analyze how many pixels are outside the available gamut produced by the previous frame's backlighting conditions, and how many are only just achievable. In so doing, it is possible to make incremental changes to the duty ratios to allow more vivid colors, brighter pixels, or to save power by reducing the LED duty ratios, or trading RGB duty ratio for W duty ratio which is a more efficient backlight state.

In another embodiment, the RGB data values might be converted into a different device-dependent color space, such as HSV. This may simplify calculations, for example, because colors of the same hue may require the same ratio of LED duty ratios. In this approach, one method includes preparing a look-up table which contains, for certain hue angles, the saturation level at which it is no longer possible to display this color using only the broadband emitter. It will also contain the LED states required at a certain saturation level, such that when analysing each pixel, by converting it into HSV space, it is possible to quickly determine the extent, if any, that the narrowband emitters are needed.

In another embodiment, the control electronics will store in its memory the conversion matrices of a number of different backlight states. For example, the conversion from image data in RGB space, into RGB space for the new backlight state, where the available backlight states might include the case of W LED fully on, and the case of RGB LEDs fully on, and the case of R,W LEDs fully on, and so on. There may be many intermediate steps, and it is not necessary for one LED to be fully on at all. Then, when there is new image data to analyse, the algorithm will cycle through each backlight state, preferably beginning with the least power-demanding, until a state is found which can suitably display the current image. Then, this backlight state is selected and the image is converted for accurate display as before.

In another embodiment, the image content can be plotted in a 3D chart in such a way that a convex hull can be calculated, which just encloses all the data points. Then, the algorithm calculates the LED duty ratios requiring minimal power consumption such that the 3D gamut produced by these LED states completely encloses the convex hull.

In another embodiment, this invention can be applied to displays in which there are no color filters, but instead R,G,B,W color components are displayed time sequentially to produce the required composite color. The claimed invention can analyze the image content and, in images where one or more colors are not fully saturated, can combine the White LED with other LEDs such that the power requirement is reduced without the image losing saturation. The present invention may be particularly advantageous for such color sequential displays as it allows the lower power W emitter to be used in one or two of the color periods only, retaining the maximal saturation of the remaining color fields unlike in the spatial color display of the principal embodiment in which any emission from the W LEDs reduces the saturation of all color components together.

In another embodiment, the conversion of color coordinates from RGB space into a device-independent color space such as CIE XYZ, is not a linear transformation using a 3×3 matrix. Instead, a new color space is developed which is a combination of two different spaces. It is well know that displays with a large color gamut can increase the vividness of colors in a way in which they were not intended to be shown. This may be acceptable for already vivid colors, but for pale colors such as skin tones, this can shift the colors so that their perceived appearance is significantly different from their true appearance, which often is not preferable for the viewer. Therefore, it is proposed that for pale colors, a pale color space is used, whose maximum vividness is relatively low, while for vivid colors, a more vivid color space is used. This may be a defined standard such as Adobe RGB, or it may simple be the maximum the display can produce, or other options. Then, depending on the saturation level of each pixel, a blend of the two color spaces is used to determine the desired XYZ level. This is used in calculating the optimal LED duty ratios, and later in the process flow when converting the image to be displayed in the new backlight state.

It has been mentioned throughout this disclosure, although not everywhere stated, that when calculating the desired duty ratios for the four LED types, it may be preferable to require that every pixel in the image is to be displayed faithfully, but it may be more preferable, for example to reduce the power consumption of the device, to allow a particular amount of pixels to be displayed inaccurately.

Although the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

An aspect of the invention, therefore, is a display. In exemplary embodiments, the display includes a backlight portion having at least one broad spectrum emitter and at least one narrow spectrum emitter, wherein the broad spectrum emitter emits light of a broader spectrum that the narrow spectrum emitter, an image panel for displaying an image by spatial light modulation, and control electronics configured to receive input image data and output control signals to both the backlight portion and the image panel. The control electronics is configured to use color rendering capabilities of the image panel under illumination from each of the emitter types individually to calculate a minimum power combination of emission from each emitter type required to display the input image data. The control electronics is further configured to modify the input image data according to the calculated minimum power combination of emitter powers so a resulting display of colours in the image data remains despite changing illumination conditions.

In an exemplary embodiment of the display, the broad spectrum emitter is a white emitter and the narrow spectrum emitter is at least one of red, green, and blue spectrum emitters.

In an exemplary embodiment of the display, the image panel is operated without color filters, with the backlight to give time sequential color fields in multiple sub-frames, and the broad spectrum emitter is utilised either concurrently with one or more of the narrow spectrum emitters during any of the sub-frames, or in an additional sub-frame, to increase the brightness or power efficiency of the display at the expense of excess color saturation for one or more color components independently according to the input image data.

In an exemplary embodiment of the display, the image panel is a liquid crystal panel that has red, green, and blue color filters.

In an exemplary embodiment of the display, the liquid crystal panel further has a white color filter.

In an exemplary embodiment of the display, the control electronics processes the image data in a device independent color space to calculate the power combination of emitter powers.

In an exemplary embodiment of the display, emitter powers are calculated using an extent to which pixels of the liquid crystal panel are outside a gamut achievable by the broadband emitter to determine a balance between the narrow spectrum emitters and the broad spectrum emitters.

In an exemplary embodiment of the display, the emitter powers are calculated to minimize the power requirement of the backlight by solving a linear programming problem given by constraints of required brightness and required saturation.

In an exemplary embodiment of the display, display colors of the input image data are specified by a known colour standard, and the input image data modification is configured to maintain constancy of all input colours under different emitter power combinations.

In an exemplary embodiment of the display, the control electronics continuously controls a changing color appearance of image regions with constant input image data when other regions of the image are changed.

In an exemplary embodiment of the display, display colors of the input image data are a maximum gamut achievable by the display with all the narrow spectrum emitters on simultaneously.

In an exemplary embodiment of the display, display colors of the input image data are a maximum gamut achievable by the display with the narrow spectrum emitters on individually.

In an exemplary embodiment of the display, a measure of whether an increase or decrease in each of the emitter levels required is calculated, and the emitter power levels are incremented in a direction indicated according to the calculated increase or decrease requirement in each of the emitter levels.

In an exemplary embodiment of the display, the emitter power values are calculated for every frame of input image data input to the display.

In an exemplary embodiment of the display, the emitter power value calculations are performed asynchronously to the rest of the control electronics, and the image conversion uses most recently calculated and applied emitter powers.

In an exemplary embodiment of the display, previous results of the emitter power calculation are taken into account and a change in emitter power to a next output combination is restricted, so as to smooth sudden changes in display backlight illumination.

In an exemplary embodiment of the display, display colors of the input image data are based on a non-linear transformation of RGB data, or a blended combination of multiple color spaces based on the color's saturation level.

INDUSTRIAL APPLICABILITY

The invention is applicable to any color transmissive display in which a wide colour gamut is desirable for at least some potential image content or usage scenario, and power consumption is a consideration.

The invention claimed is:

1. A display comprising:
   a backlight portion comprising at least one broad spectrum emitter and at least one narrow spectrum emitter, wherein the broad spectrum emitter emits light of a broader spectrum that the narrow spectrum emitter;
   an image panel for displaying an image by spatial light modulation; and
   control electronics configured to receive input image data and output control signals to both the backlight portion and the image panel;
   wherein the control electronics is configured to use color rendering capabilities of the image panel under illumination from each of the emitter types individually to calculate a minimum power combination of emission from each emitter type required to display the input image data, and
   the control electronics is further configured to modify the input image data according to the calculated minimum power combination of emitter powers so a resulting display of colours in the image data remains despite changing illumination conditions.

2. The display of claim 1, wherein the broad spectrum emitter is a white emitter and the narrow spectrum emitter is at least one of red, green, and blue spectrum emitters.

3. The display of claim 1, wherein the image panel is operated without color filters, with the backlight to give time sequential color fields in multiple sub-frames, and the broad spectrum emitter is utilised either concurrently with one or more of the narrow spectrum emitters during any of the sub-frames, or in an additional sub-frame, to increase the brightness or power efficiency of the display at the expense of excess color saturation for one or more color components independently according to the input image data.

4. The display of claim 1, wherein the image panel is a liquid crystal panel that has red, green, and blue color filters.

5. The display of claim 4, wherein the liquid crystal panel further has a white color filter.

6. The display of claim 1, wherein the control electronics processes the image data in a device independent color space to calculate the power combination of emitter powers.

7. The display of claim 6, wherein emitter powers are calculated using an extent to which pixels of the liquid crystal panel are outside a gamut achievable by the broadband emitter to determine a balance between the narrow spectrum emitters and the broad spectrum emitters.

8. The display of claim 7, wherein the emitter powers are calculated to minimize the power requirement of the backlight by solving a linear programming problem given by constraints of required brightness and required saturation.

9. The display of claim 1, wherein display colors of the input image data are specified by a known colour standard, and the input image data modification is configured to maintain constancy of all input colours under different emitter power combinations.

10. The display of claim 9, wherein the control electronics continuously controls a changing color appearance of image regions with constant input image data when other regions of the image are changed.

11. The display of claim 1, wherein display colors of the input image data are a maximum gamut achievable by the display with all the narrow spectrum emitters on simultaneously.

12. The display of claim 1, wherein display colors of the input image data are a maximum gamut achievable by the display with the narrow spectrum emitters on individually.

13. The display of claim 1, wherein a measure of whether an increase or decrease in each of the emitter levels required is calculated, and the emitter power levels are incremented in a direction indicated according to the calculated increase or decrease requirement in each of the emitter levels.

14. The display of claim 1, wherein the emitter power values are calculated for every frame of input image data input to the display.

15. The display of claim 1, wherein the emitter power value calculations are performed asynchronously to the rest of the control electronics, and the image conversion uses most recently calculated and applied emitter powers.

16. The display of claim 1, wherein previous results of the emitter power calculation are taken into account and a change in emitter power to a next output combination is restricted, so as to smooth sudden changes in display backlight illumination.

17. The display of claim 1, wherein display colors of the input image data are based on a non-linear transformation of RGB data, or a blended combination of multiple color spaces based on the color's saturation level.

* * * * *